US010903943B2

(12) United States Patent
Tabet et al.

(10) Patent No.: US 10,903,943 B2
(45) Date of Patent: Jan. 26, 2021

(54) ENHANCED LTE UL HARQ FEEDBACK INDICATION FOR POWER SAVING AND RANGE IMPROVEMENT

(71) Applicant: Apple Inc., Cupertino, CA (US)

(72) Inventors: Tarik Tabet, Los Gatos, CA (US); Youngjae Kim, San Jose, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 14/729,285

(22) Filed: Jun. 3, 2015

(65) Prior Publication Data

US 2015/0365198 A1 Dec. 17, 2015

Related U.S. Application Data

(60) Provisional application No. 62/012,226, filed on Jun. 13, 2014.

(51) Int. Cl.
*H04L 1/18* (2006.01)
*H04L 1/16* (2006.01)
(Continued)

(52) U.S. Cl.
CPC .......... *H04L 1/1812* (2013.01); *H04L 1/1657* (2013.01); *H04L 1/1671* (2013.01);
(Continued)

(58) Field of Classification Search
None
See application file for complete search history.

(56) References Cited

U.S. PATENT DOCUMENTS

2009/0241004 A1* 9/2009 Ahn ............... H04L 1/1812
714/749
2012/0176887 A1 7/2012 Mcbeath et al.
(Continued)

FOREIGN PATENT DOCUMENTS

CN 101771513 7/2010
CN 102547779 7/2012
(Continued)

OTHER PUBLICATIONS

UL HARQ Procedure Without PHICH—3GPP TSG RAN WG1 Meeting #70, Aug. 13-17, 2012.*
(Continued)

*Primary Examiner* — Peter Chen
*Assistant Examiner* — Jeff Banthrongsack
(74) *Attorney, Agent, or Firm* — Kowert, Hood, Munyon, Rankin & Goetzel, P.C.

(57) ABSTRACT

Mobile devices, base stations, and/or relay stations may implement a method for an improved and reliable automatic repeat request feedback indication. A mobile device (UE) may establish communication within a wireless network, and indicate to the network that the UE is a special type device, e.g. a constrained device. The network (base station) may then not send an indication on a physical indicator channel to the UE when certain conditions are met, and instead, the mobile device may interpret control information received from the network on a physical control channel as a negative acknowledgment indication corresponding to an automatic repeat request from the network. The UE may then perform a retransmission according to the interpreted control information. A new control information format may be used to further define how the network and UE implement the automatic repeat request process, to reduce the total number of bits required in the control information.

20 Claims, 10 Drawing Sheets

(51) Int. Cl.
*H04L 5/00* (2006.01)
*H04W 72/04* (2009.01)

(52) U.S. Cl.
CPC ............ *H04L 1/1896* (2013.01); *H04L 5/006* (2013.01); *H04L 5/0055* (2013.01); *H04W 72/042* (2013.01)

(56) References Cited

U.S. PATENT DOCUMENTS

| | | | | |
|---|---|---|---|---|
| 2013/0051341 | A1* | 2/2013 | Suzuki | H04L 1/1835 370/329 |
| 2013/0077660 | A1* | 3/2013 | Ko | H04B 7/0639 375/219 |
| 2013/0265948 | A1* | 10/2013 | Lee | H04L 1/1861 370/329 |
| 2013/0279480 | A1 | 10/2013 | Park et al. | |
| 2015/0098418 | A1 | 4/2015 | Vajapeyam et al. | |

FOREIGN PATENT DOCUMENTS

| | | |
|---|---|---|
| EP | 2651069 A1 | 10/2013 |
| GB | 2498815 A | 7/2013 |
| WO | WO2013149390 A1 | 10/2013 |

OTHER PUBLICATIONS

Search Report, International Application No. PCT/US2015/034151, dated Aug. 13, 2015, 5 pages.
Written Opinion, International Application No. PCT/US2015/034151, dated Aug. 13, 2015, 10 pages.
Panasonic, "UL HARQ procedure without PHICH", 3GPP Discussion, 3rd Generation Partnership Project, Aug. 13-17, 2012, 4 pages, Qingdao, China.
Samsung, "Issues on PHICH-less PUSCH HARQ operation in TDD CA", 3GPP Discussion, 3rd Generation Partnership Project, Aug. 13-17, 2012, 4 pages, Qingdao, China.
Mediatek Inc., "Need of UL HARQ and PHICH enhancement", 3GPP Discussion, 3rd Generation Partnership Project, Oct. 7-11, 2013, 4 pages, Guangzhou, China.
Mediatek Inc., "Discussion on HARQ realization for PUSCH in Coverage Enhancement", 3GPP Discussion, 3rd Generation Partnership Project, Feb. 10-14, 2014, Prague, Czech Republic.
LG Electronics, "Introduction of no PHICH monitoring operation", 3GPP Discussion, 3rd Generation Partnership Project, Oct. 8-12, 2012, San Diego, USA.
Office Action for ROC (Taiwan) Patent Application No. 104118404, dated Jul. 26, 2016, pp. 1-14.
Panasonic, "UL HARQ procedure without PHICH", 3GPP TSG RAN WG1 Meeting #70, R1-123293, Qingdao, China, Aug. 13-17, 2012, pp. 1-5.
First Office Action, Chinese Application for Invention No. 201580026188.X, dated Feb. 3, 2019, 89 pages.
Extended European Search Report for EP Application No. 20187338.7, dated Oct. 20, 2020, 8 pages.

* cited by examiner

FIG. 10a (Prior Art) — Current Format 0A Contents

| | Carrier Indicator | Flag for Format0/Format 1A | Hopping Flag | M_ULhop | Resource Block Assignment | MCS & RV | NDI | TPC Command | Cyclic Shift for DM RS and OCC Index | UL Index (TDD Only) | DAI | CSI Request | SRS Request | Resource Allocation Type | Ack/Nack |
|---|---|---|---|---|---|---|---|---|---|---|---|---|---|---|---|
| Format 0 | 0-3 Bits | 1 Bit | 1 Bit | 1-2 Bits | 5-13 Bits | 5 Bits | 1 Bit | 2 Bits | 3 Bits | 2 Bits | 2 Bits | 1 or 2 Bits | 0 or 1 Bit | 0 or 1 Bit | N/A |

1002

FIG. 10b — New Format 0A Contents

| | Carrier Indicator | Flag for Format0/Format 1A | Hopping Flag | M_ULhop | Resource Block Assignment | MCS & RV | NDI | TPC Command | Cyclic Shift for DM RS and OCC Index | UL Index (TDD Only) | DAI | CSI Request | SRS Request | Resource Allocation Type | Ack/Nack |
|---|---|---|---|---|---|---|---|---|---|---|---|---|---|---|---|
| New Format 0A | N/A | N/A | N/A | N/A | N/A | 5 Bits (Optional) | 1 Bit | N/A | N/A | N/A | N/A | 1 or 2 Bits (Optional) | 0 or 1 Bit (Optional) | N/A | 1 Bit (No ULMIMO/CA) |

1004

ENHANCED LTE UL HARQ FEEDBACK INDICATION FOR POWER SAVING AND RANGE IMPROVEMENT

PRIORITY CLAIM

This application claims benefit of priority of U.S. Provisional Patent Application Ser. No. 62/012,226 titled "Enhanced LTE UL HARQ Feedback Indication for Power Saving and Range Improvement", filed on Jun. 13, 2014, which is hereby incorporated by reference as though fully and completely set forth herein.

FIELD OF THE INVENTION

The present application relates to wireless communication devices, and more particularly to methods for providing enhanced HARQ feedback indication among wireless communications devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

In wireless data communications, automatic repeat request (ARQ; also referred to as automatic repeat query), is used as an error-control method for data transmission that uses acknowledgements (messages sent by the receiver indicating that it has correctly received a data frame or packet) and timeouts (specified time periods allowed to elapse before an acknowledgment is received) to achieve reliable data transmissions. If the sender does not receive an acknowledgment before the timeout, it usually re-transmits the frame/packet until the acknowledgment is received, or the number of re-transmissions has exceeded a predefined limit.

Hybrid automatic repeat request (HARQ) is a combination of high-rate forward error-correcting coding and ARQ error-control. While in standard ARQ, redundant bits are added to data to be transmitted using an error-detecting code such as a cyclic redundancy check (CRC), with receivers detecting a corrupted message requesting a new message from the sender, in Hybrid ARQ the original data is encoded with a FEC (forward error correction or forward error coding) code, and the parity bits are either immediately transmitted along with the message or transmitted only upon request by a receiver that has detected an erroneous message. The FEC code is typically used to correct an expected subset of all errors that may occur, while the ARQ method is used as a fallback to correct errors that cannot be corrected through the use of only the redundancy included in the initial transmission. Therefore, hybrid ARQ offers better performance in poor signal conditions, but at the expense of significantly lower throughput during good signal conditions. A signal quality crossover point may be defined, below which simple HARQ may be preferred, and above which basic ARQ may be used.

Long Term Evolution (LTE) is the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines three physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

The Physical Hybrid ARQ Indicator Channel (PHICH) is a DL control channel that carries the HARQ acknowledge/negative-acknowledge (ACK/NACK), indicating to the UE whether the eNB correctly received uplink user data carried on the PUSCH. Information over the PHICH is typically BPSK (Binary Phase Shift Keying) modulated. The Physical Control Format Indicator Channel (PCFICH) is a DL control channel that carries the Control Frame Indicator (CFI) which includes the number of orthogonal frequency-division multiplexing (OFDM) symbols used for control channel transmission in each subframe (typically 1, 2, or 3). The 32-bit long CFI is mapped to 16 Resource Elements in the first OFDM symbol of each downlink frame using QPSK modulation.

Therefore, as indicated above, during data communication over LTE, the DL uses the physical channel PDSCH, while in UL it uses the UL channel PUSCH. As also mentioned above, these two channels convey the transport blocks of data in addition to some MAC control and system information. As further alluded to above, in cellular systems and 3GPP, HARQ, which is a combination of FEC and a retransmission mechanism, is used to obtain information and/or indication of data communication reliability. If a packet reception to node A (e.g., a base station or eNB) fails, node A transmits a NACK to node B (e.g., a UE). Node B then retransmits the packet with additional redundancy bits. In LTE, the PHICH carries the ACK/NACK information for PUSCH received by the eNB. PHICH is BPSK encoded, and may be spread with Walsh Hadamard sequences.

The reliable detection of the PHICH is very important, as incorrect detection may result in various issues affecting proper transmissions. One such issue may be a missed ACK, which occurs when the eNB (base station or network) sends a positive ACK and the UE decodes it as a NACK. This causes the UE to retransmit the packet in the PUSCH (i.e. over a UL channel), which can cause interference and collision. Another issue may be a False ACK, which occurs when the eNB sends a negative NACK and the UE decodes it as positive ACK. This causes the UE to not retransmit, which ultimately can lead to radio link control (RLC) retransmissions. Hence, successful detection of PHICH is important for UL HARQ. It is therefore desirable to alleviate the effects of bad reception of PHICH, for example when the device is range constrained or situated in a bad coverage area.

SUMMARY OF THE INVENTION

Embodiments described herein relate to a User Equipment (UE) device, base station, and/or relay station, and associated method for enhanced Long Term Evolution (LTE) Uplink Hybrid Automatic Repeat Request (UL HARQ) feedback indication for power saving and range improvement during wireless communications, e.g. during LTE communications and transmissions. In one set of embodiments, a UE that is constrained in the Physical HARQ Indicator Channel (PHICH) performance may be enabled to provide such an indication to the wireless network (NW) at an early stage. Accordingly, the NW may use a new information element in the Radio Resource Control (RRC) Connection Reconfiguration message that follows the exchange of UE capability information. Specifically, the UE Capability Information message may be a natural RRC message that is used to indicate to the NW the nature of the device, and that it supports a default configuration that includes a "UE category". Currently, 3GPP specifies only categories 0-10, and therefore any other UE category value beyond 10 may be used to identify the UE. Alternatively, some Random Access Procedure (RACH) preambles may be restricted/dedicated to UEs identified/operating as constrained devices. By detecting these particular preambles, the NW may recognize that the device is constrained in terms of PHICH performance or that the device is range constrained. These indications may be generalized for any performance issue related to either Downlink (DL) Physical Channel (PHY) or Uplink (UL) PHY.

Once the UE has indicated to the NW that the UE is a constrained device, communication between the NW and the UE may be conducted as follows. In one embodiment, the UE may always discard PHICH, i.e., it may not attempt to detect PHICH, and simply discard the PHICH based on some metric, which may be an energy metric, e.g. Signal-to-Interference-plus-Noise-Ratio (SINR), or Reference Signal Received Power (RSRP). The NW may decide to not transmit PHICH to that particular constrained UE, according to a previously determined agreement with the constrained UE, and/or based on metrics reported by the constrained UE. For example, the NW may anticipate/have knowledge of how much degradation to expect on the SINR for such a constrained device, and may also take into consideration such reported metrics as Channel Quality Indicator (CQI) and/or RSRP.

Thus, the NW (i.e. a base station or eNB) may be operated to always transmit a Physical Downlink Control Channel (PDCCH) DCI0, instead of transmitting a NACK on PHICH. For an ACK, the NW may not transmit PDCCH. Then, if the UE does not detect PDCCH, it may interpret the lack of a detected PDCCH as an ACK. The NW may also be operated to transmit both PHICH and PDCCH DCI0, with DCI0 containing information about retransmissions. The new data indicator (NDI) may not be toggled in case of NACK, which means that the UE may retransmit the packet in PUSCH. The DCI0 may contain the redundancy version (RV) and the grant. Even if the grant does not change across HARQ retransmissions, the grant information may be sent every time a retransmission (NACK) is occurring. The NW may also use the DCI information to change the grant if needed. It is advantageous to use DCI as opposed to NACK (PHICH), as DCI is more robustly coded.

In one set of embodiments, a new DCI format may be introduced to further improve HARQ feedback indication among wireless communications devices. The new format may specify the following minimum of information:
NDI (1 bit)
ACK/NACK bit (1 bit)
This information may be adopted for running the UL HARQ. The small size of the content specified in this format and the potential use of a high aggregation level (for e.g. AL=8) lowers the coding rate, and hence improves the performance detection of the ACK/NACK information. As a possible alternative/extension, this new format may also include bits on Channel State Information/Sounding Reference Signal (CSI/SRS) request, and Modulation and Coding Scheme/Redundancy Version (MCS/RV) to provide more flexibility to the eNB scheduler.

BRIEF DESCRIPTION OF THE DRAWINGS

FIG. 10a illustrates the contents of Downlink Control Information (DCI) for the current format, according to prior art;

FIG. 10b illustrates the contents of DCI for a new proposed format for improved HARQ feedback indication, according to one set of embodiments.

Figure 1:
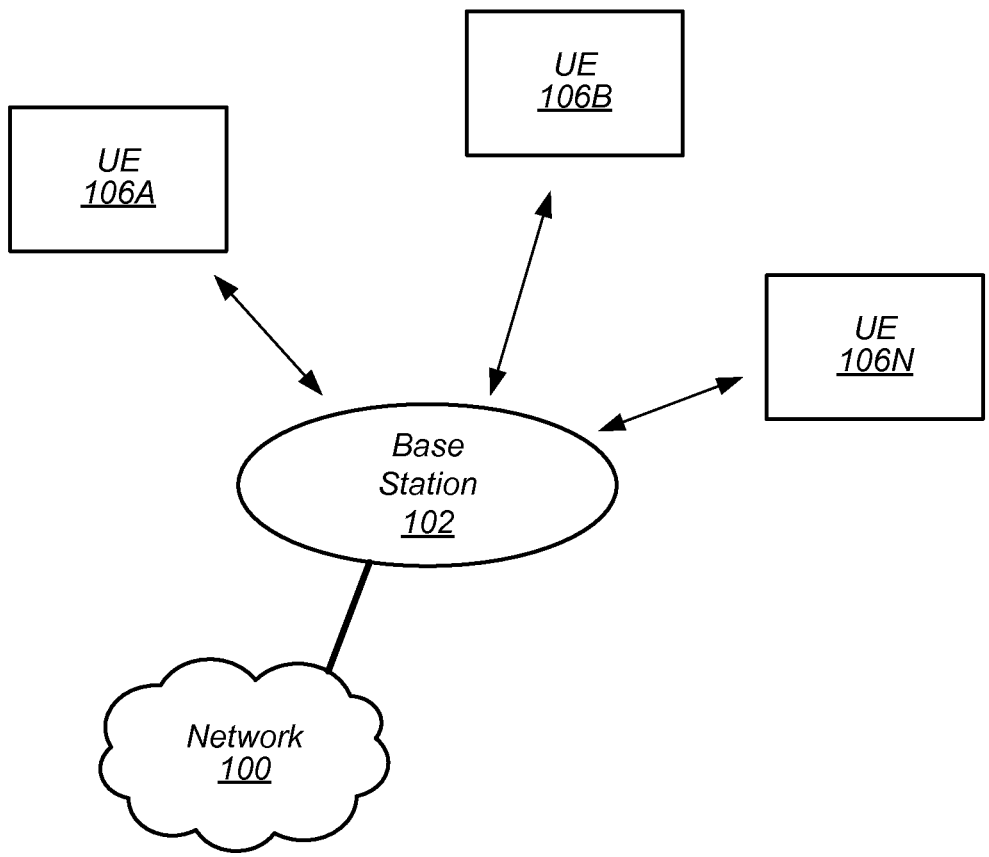
FIG. 1 illustrates an exemplary (and simplified) wireless communication system according to one set of embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge
ARQ: Automatic Repeat Request (also: Automatic Repeat Query)
BER: Bit Error Rate
BPSK: Binary Phase-Shift Keying
BS: Base Station
CCE: Control Channel Elements
CFI: Control Frame Indicator
CQI: Channel Quality Indicator
CRC: Cyclic Redundancy Check
DCI: Downlink Control Information
DL: Downlink (from BS to UE)
DLSCH: Downlink Shared Channel
FDD: Frequency Division Duplexing
FEC: Forward Error Correction
GPS: Global Positioning System
GSM: Global System for Mobile Communication
HARQ: Hybrid Automatic Repeat Request
LTE: Long Term Evolution
MAC: Media Access Control (layer)
MIMO: Multiple-In Multiple-Out
NACK: Negative Acknowledge
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel
PDU: Protocol Data Unit
PHICH: Physical HARQ Indicator Channel
PUSCH: Physical Uplink Shared Channel
PHY: Physical (Layer)
QPSK: Quadrature Phase-Shift Keying
REG: Resource Element Group
RACH: Random Access Procedure
RNTI: Radio Network Temporary Identifiers
RRC: Radio Resource Control
RSRP: Reference Signal Received Power
RSSI: Reference Signal Strength Indicator
RX: Reception
SINR: Signal-To-Interference-Plus-Noise Ratio
TB: Transport Blocks
TDD: Time Division Duplexing
TTI: Transmission Time Interval
TX: Transmission
UE: User Equipment
UL: Uplink (from UE to BS)
ULSCH: Uplink Shared Channel
UMTS: Universal Mobile Telecommunication System Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable electronic devices (e.g. Apple Watch™, Google Glass™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DCI—refers to downlink control information. There are various DCI formats used in LTE in PDCCH (Physical Downlink Control Channel). The DCI format is a predefined format in which the downlink control information is packed/formed and transmitted in PDCCH.

Figure 2:
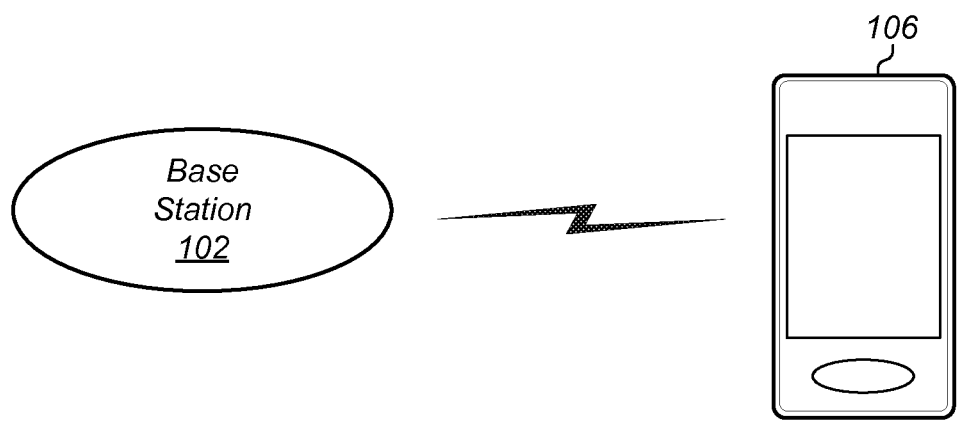
FIG. 2 illustrates a base station in communication with a wireless user equipment (UE) device according to one set of embodiments.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network (NW) insofar as uplink and downlink communications of the UE are concerned. Thus, a UE communicating with one or more base stations in the network (NW) may also be interpreted as the UE communicating with the NW.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 according to improved UL and DL decoupling methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments of improved decoding of PCFICH described herein, or any portion of any of the method embodiments of improved decoding of PCFICH described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and Bluetooth. Other configurations are also possible.

Figure 3:
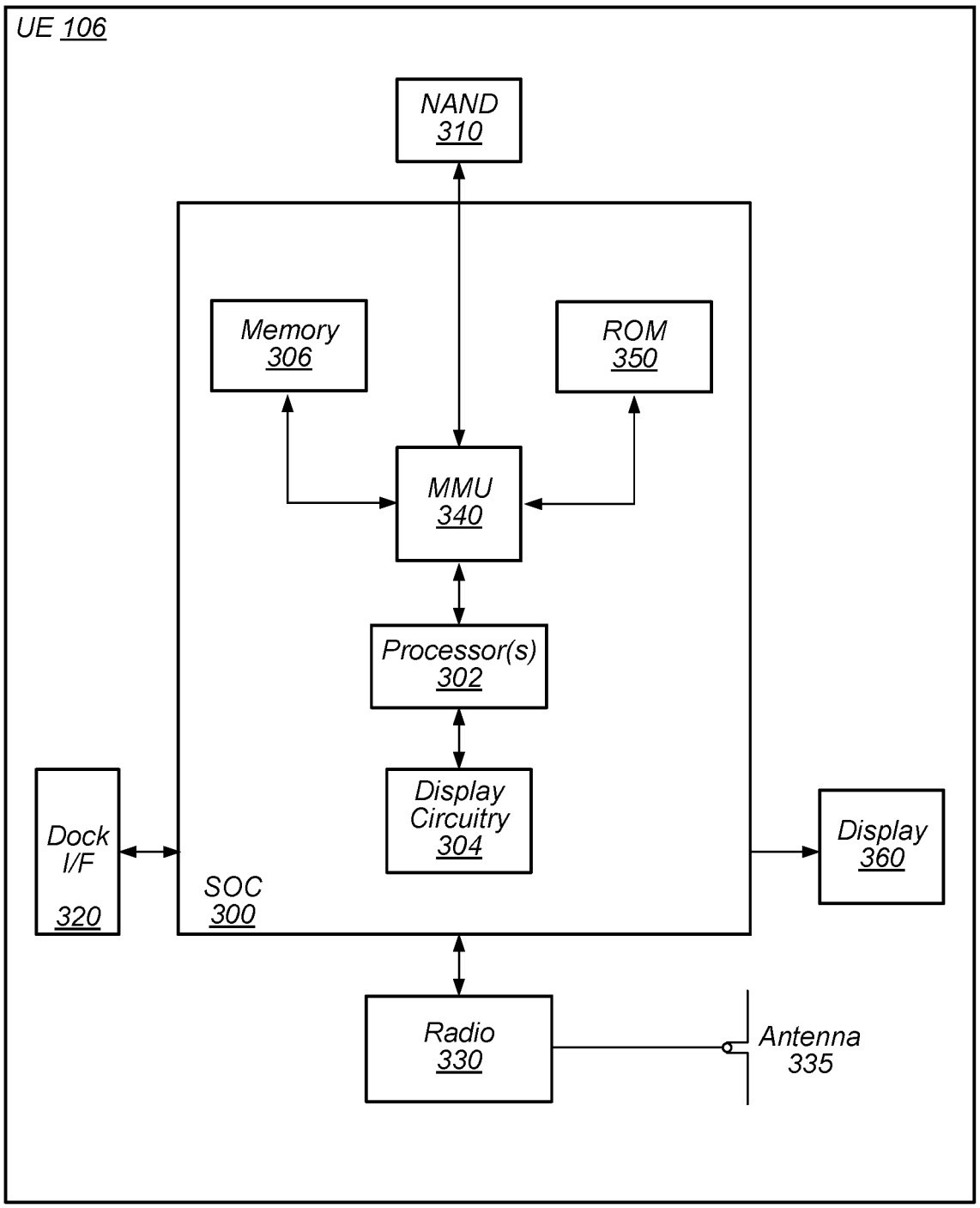
FIG. 3 illustrates an exemplary block diagram of a UE, according to one set of embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, Bluetooth, Wi-Fi, GPS, etc.). The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As will be further described herein, the UE 106 (and base station 102) may include hardware and/or software components for implementing improved HARQ feedback indication during wireless communications. The processor 302 of the UE device 106 may be configured to implement part or all of methods of improved HARQ feedback indication described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components, such as Radio 330, as shown in FIG. 3, to implement improved UL HARQ feedback indication according to various embodiments disclosed herein.

Figure 4:
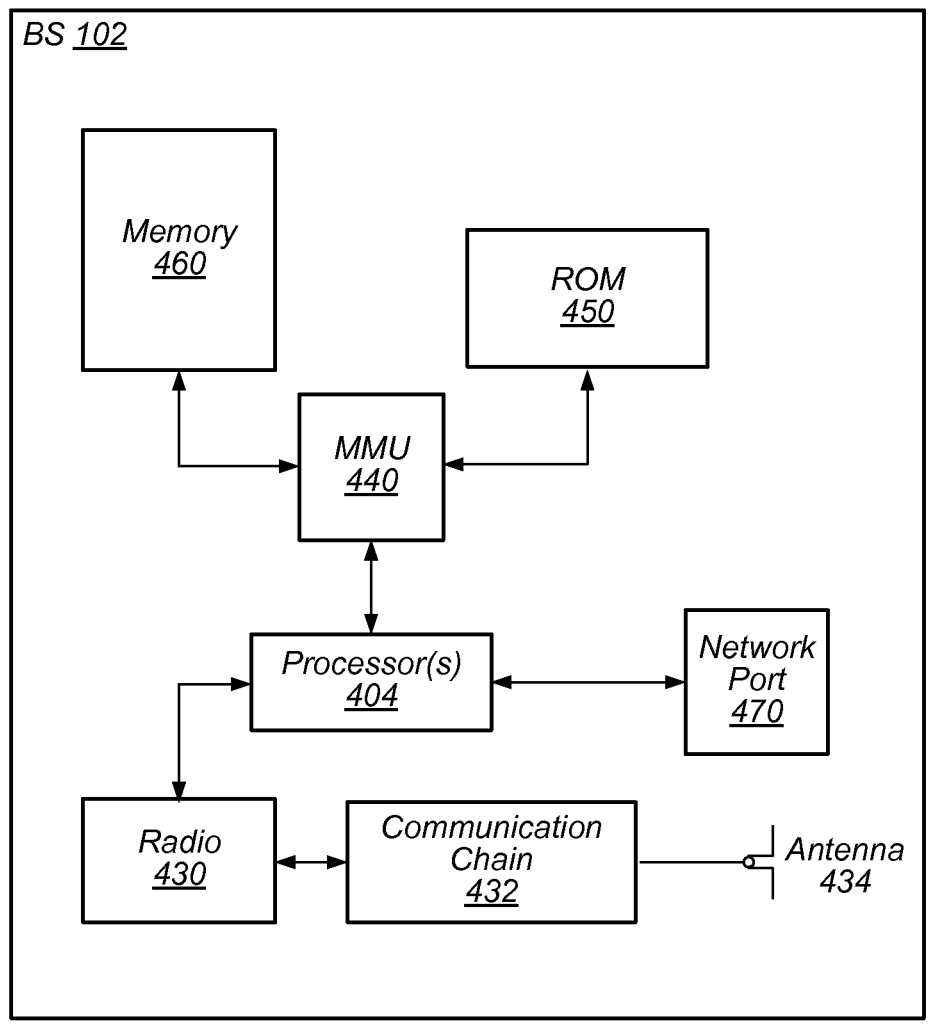
FIG. 4 illustrates an exemplary block diagram of a base station according to one set of embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor(s) 404 of the base station 102 may be configured to implement part or all of methods described herein for improved UL HARQ feedback indication for power saving and range improvement during wireless communications, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof.

Overall, the various components (460, 450, 440, 404, 430, 432, 470 and 434) of BS 102 may interoperate to implement wireless communications with improved HARQ feedback indication according to at least part or all of the methods for improved HARQ feedback indication described herein. It should also be noted that in some embodiments, references to transmissions by and to a "wireless network" (NW) may be references to transmissions by and to a base station in the NW, in the sense that a base station may be responsible for facilitating wireless communications between various wireless communications devices on the NW. In such cases, references to to the NW sending and/or receiving certain wireless transmissions (or data), for example, may be references to a base station within the NW sending and/or receiving those wireless transmissions (or data). Improved HARQ Feedback Indication As previously mentioned, it is desirable to alleviate the effects of poor reception of PHICH, for example when the device is range constrained and/or situated in a poor coverage area, in order to provide an improved UL HARQ feedback indication. Therefore, various embodiments described herein relate to a UE, base station, and/or relay station, and associated method for enhanced LTE UL HARQ feedback indication for power saving and range improvement during wireless communications, e.g. during LTE communications and transmissions.

Figure 5:
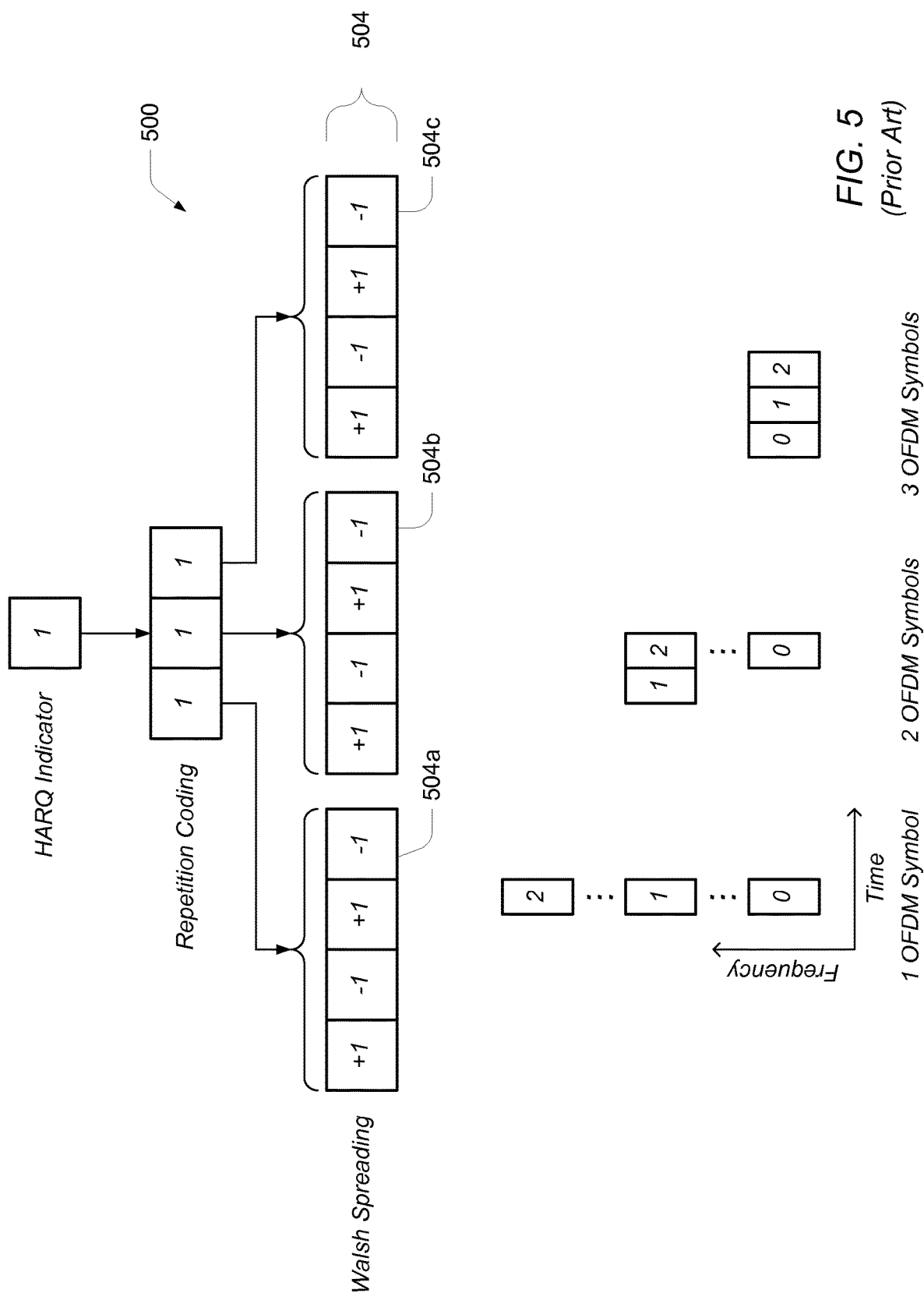
FIG. 5 illustrates the coding structure associated with transmission and detection of a Hybrid Automatic Repeat Request (HARQ) in the current 3GPP specification, according to prior art.

FIG. 5 illustrates the coding structure 500 associated with transmission and detection of a HARQ in the current 3GPP specifications, according to prior art. As shown in FIG. 5, twelve (12) subcarriers 504 (504a, 504b, 504c) are used through Walsh Spreading. Each quadruplet 504 (504a, 504b, 504c) is then mapped to an OFDM symbol, with illustrations provided for mapping to a single OFDM symbol, mapping to two OFDM symbols, and mapping to three OFDM symbols. As shown in FIG. 5, there is not much redundancy and not much channel coding to protect the HARQ indicator.

Figure 6:
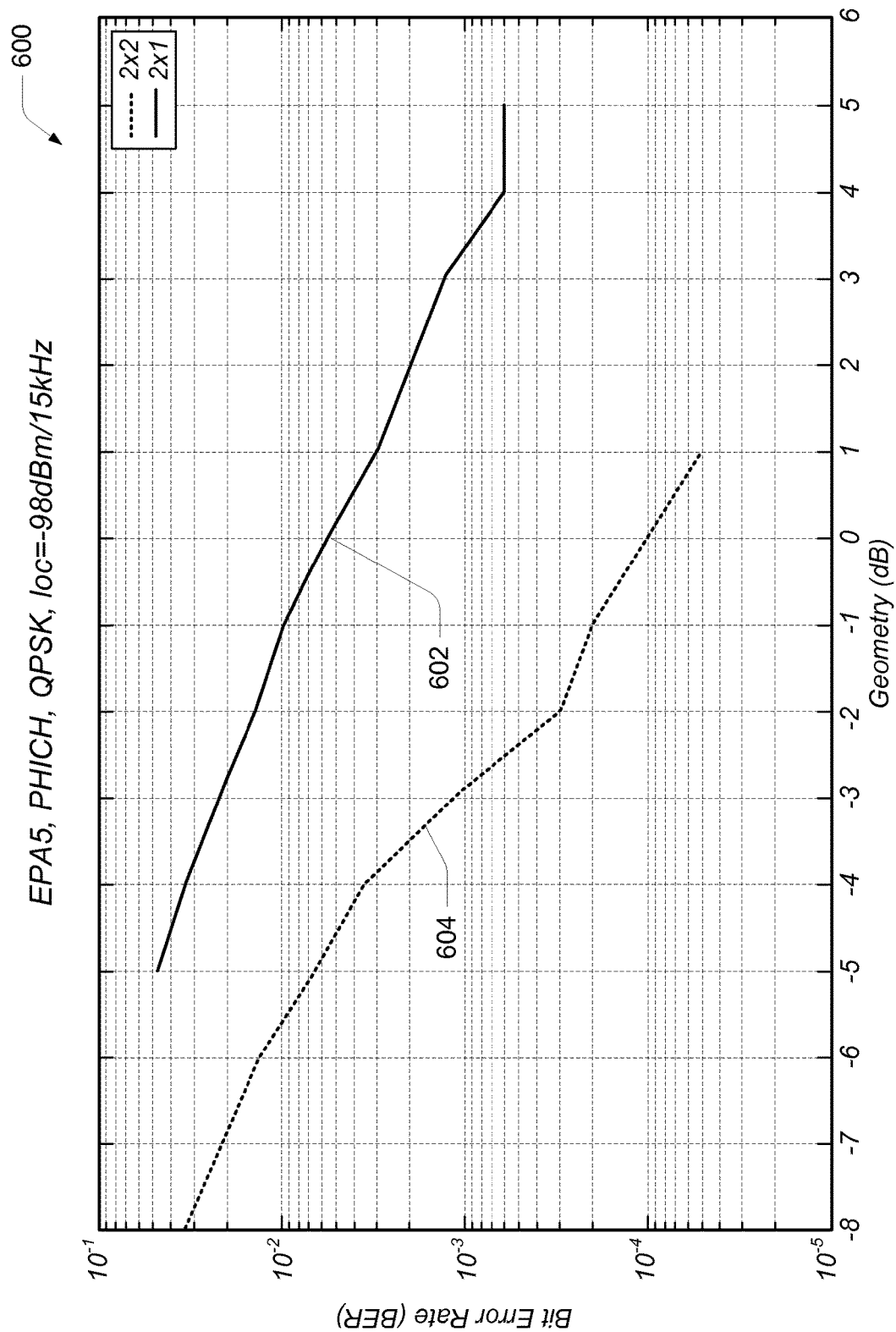
FIG. 6 illustrates one example of the performance of the Physical HARQ Indicator Channel (PHICH) in the current 3GPP specification, according to prior art.

FIG. 6 illustrates one example of the performance of the PHICH in the current 3GPP specification, according to prior art. Specifically, FIG. 6 shows a diagram 600 of Bit Error Rate (BER) vs. performance during various different antenna conditions. For example, curve 602 illustrates BER vs. performance when one antenna (of normally two operating antennas) is lost, and curve 604 illustrates BER vs. performance when one antenna is lost and the other antenna is not as efficient as it should be. Diagram 600 clearly indicates performance degradation in both cases.

Thus, in case a UE is somehow constrained, and therefore cannot reliably detect the PHICH, the UE may somehow indicate to the network (NW) that it is constrained. Overall, various embodiments described herein are of a proposed solution that avoids having to use PHICH for detecting a HARQ feedback, even though in present systems the PHICH carries the ACK/NACK HARQ feedback indications to the UE. The NW cannot be expected to not send PHICH (i.e. the NW cannot be expected not to send the PHICH) without major changes implemented in the current specification. However, still expecting the NW to send the PHICH (and the NW sending the PHICH) doesn't mean that the UE may necessarily have to detect it. Accordingly, in one set of embodiments, while the NW may still send the PHICH, the UE (or device) may be operated not to detect it. In such cases the device may be indicated as being of a type that cannot detect PHICH, and this information may be communicated to the NW.

Figure 7:
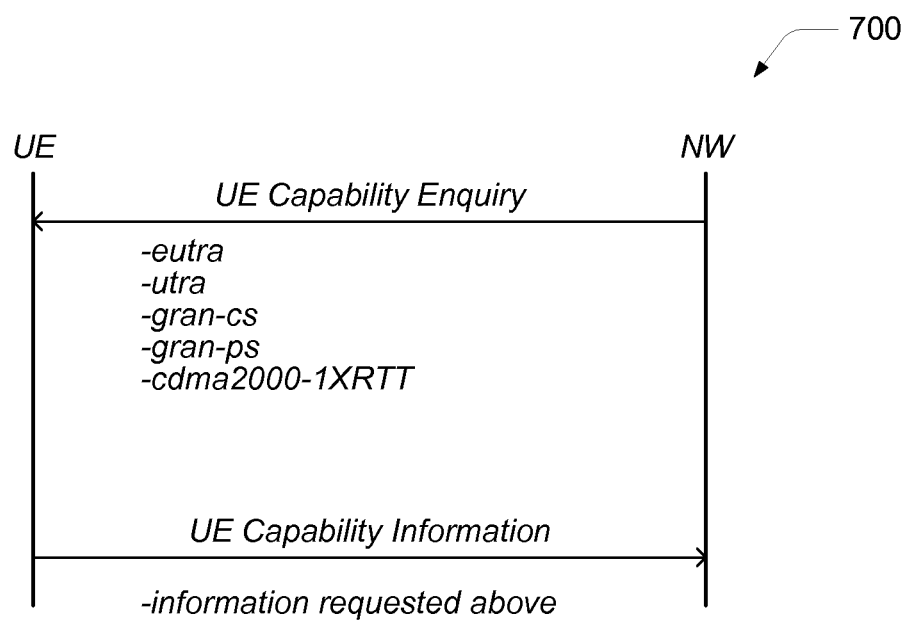
FIG. 7 illustrates how a constrained device indication is provided by a UE to a NW according to one set of embodiments.

In one set of embodiments, a UE that is constrained in the PHICH performance may be enabled to indicate this to the NW (network) at an early stage. In other words, a UE may provide an indication to the NW that the UE is somehow constrained and/or inefficient/unsatisfactory in its PHICH performance. FIG. 7 illustrates a process 700 by which such a constrained device indication is provided by a UE to a NW according to one set of embodiments. Currently, 3GPP specifies only categories 0-10, and therefore any other UE category value beyond 10 may be used to identify the UE. Through the previously reserved category (beyond category 10), the UE may indicate to the network that the device is a constrained device. Once it has been ascertained that the device is a constrained device, one of at least two methods may be employed to provide a HARQ feedback indication without using PHICH. The intent is to not have to require the network to change its implementation. That is, the indication to the NW is for the NW to send the PHICH as usual, but also indicating to the NW that the device will (likely) not decode it.

Therefore, in one set of embodiments, the network may use a new information element in the Radio Resource Control (RRC) Connection Reconfiguration message that follows the exchange of UE capability information. Specifically, the UE Capability Information message may be a natural RRC message that is used to indicate to the NW the nature of the device, and that it supports a default configuration that includes a "UE category". In one set of embodiments, some Random Access Procedure (RACH) preambles may be restricted/dedicated to these constrained devices. By detecting these particular preambles, the NW may recognize that the device is constrained in terms of PHICH performance. These indications may be generalized for any performance issue related to either DL (downlink) or UL PHY (uplink physical) channel. That is, the indication may not be limited to an indication of a constrained device, it may be an indication of any specified characteristic of the device and/or any specified performance related issues that may be faced by the device, or any other information that may be applicable and useful to mediate interaction between the NW and the device.

Figure 8:
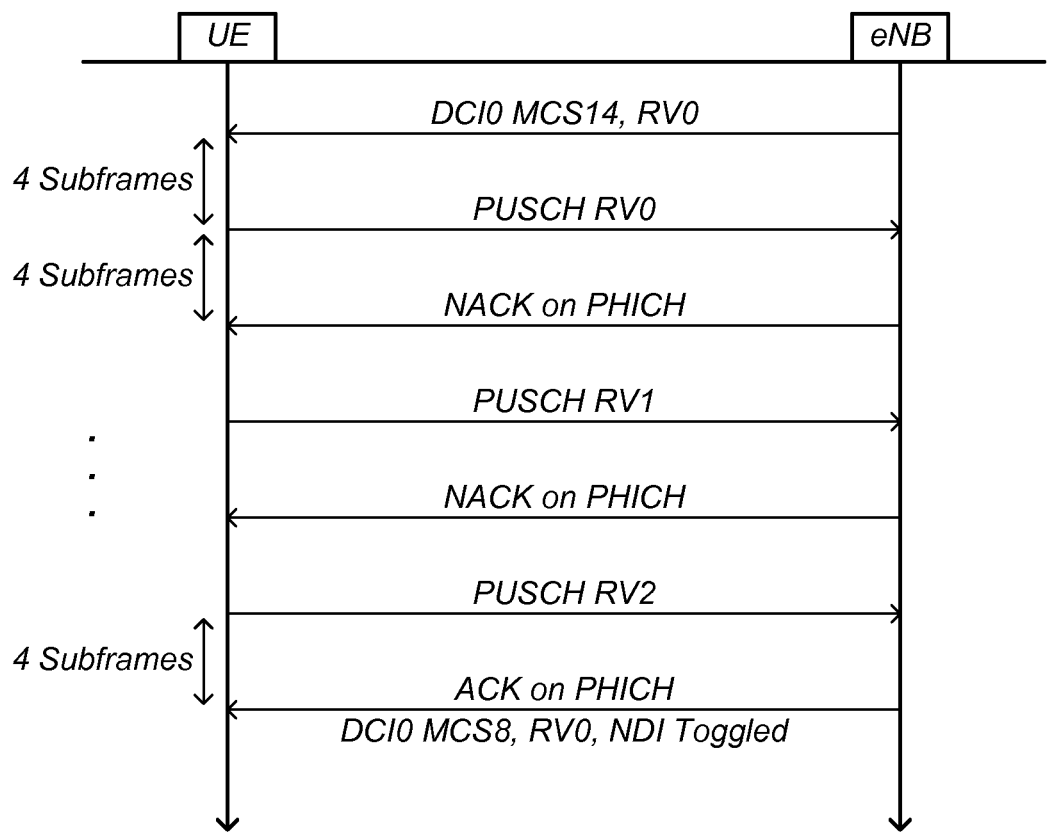
FIG. 8 illustrates the HARQ feedback indication in the current 3GPP specification, according to prior art.

FIG. 8 illustrates the transmission and detection of a HARQ in the current 3GPP specification, according to prior art. As seen in FIG. 8, the PHICH is used during the HARQ feedback indication. Once the NW decodes the packet, an ACK is transmitted back, and NDI is toggled to indicate a new transmission.

Figure 9:
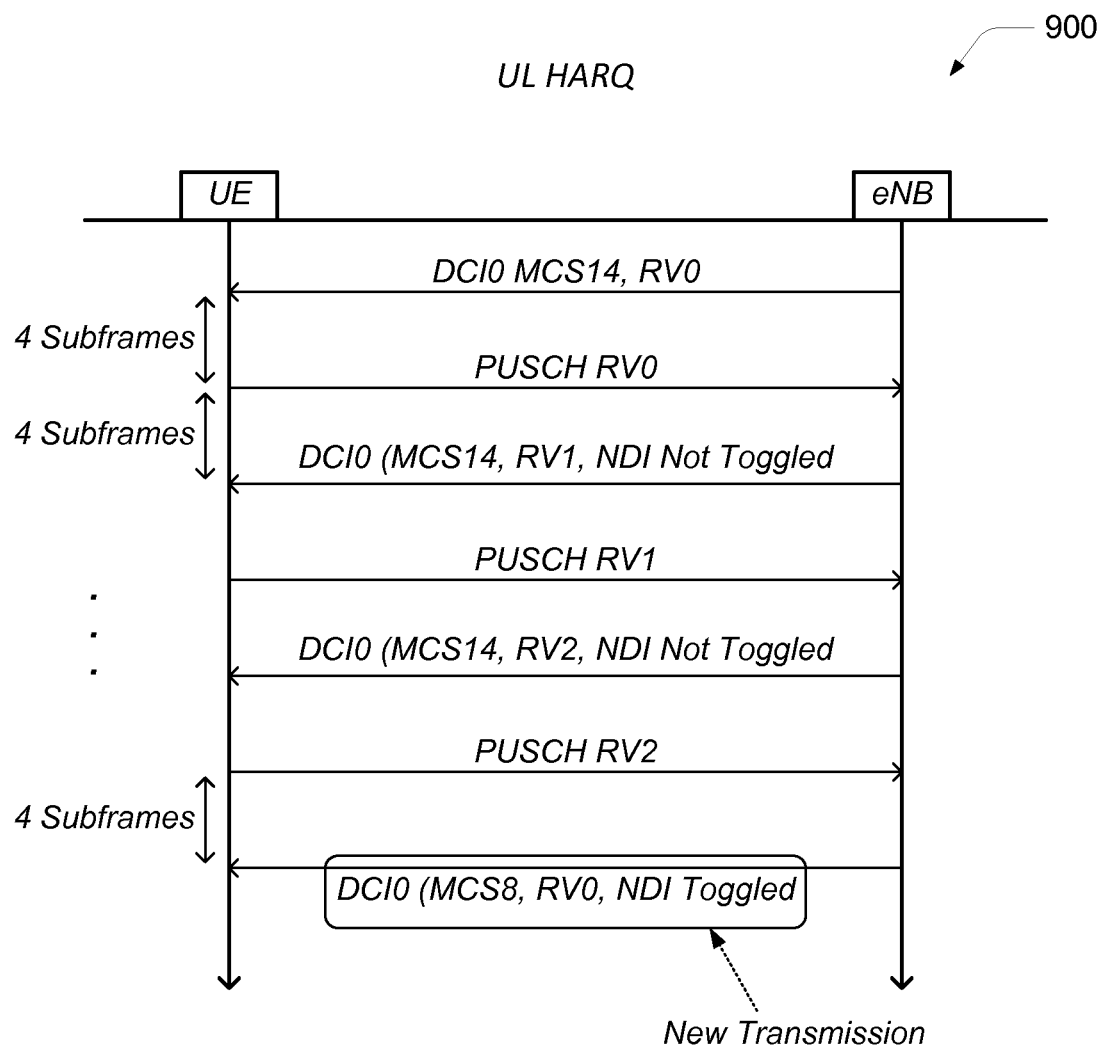
FIG. 9 illustrates HARQ feedback indication for an improved HARQ transmission and detection scheme, according to one set of embodiments.

FIG. 9 illustrates transmission and detection of a HARQ by way of an improved HARQ feedback indication scheme without the use of PHICH, according to some embodiments. As shown in diagram 900 in FIG. 9, based on an indication from the UE to the NW that the UE is a constrained device, the PHICH is discarded, responsive to one or more specified metrics that would forecast unreliable PHICH detection. In other words, once the UE has indicated to the NW that the UE is constrained, the UE may simply discard PHICH, i.e., it may not attempt to detect PHICH, and simply discard the PHICH, based on one or more specified metric(s). Such metrics may include an energy metric (e.g. Signal to Interference plus Noise Ratio—SINR, or Reference Signal Received Power—RSRP). The NW may decide not to transmit PHICH to that particular constrained UE, according to a previously determined agreement with the constrained UE, and/or based on metrics reported to the NW by the constrained UE. For example, the NW may anticipate/have knowledge of how much degradation to expect on the SINR for such a constrained device, and it may also take into consideration such reported metrics as CQI/RSRP.

In some embodiments, the NW (i.e. a base station or eNB) may be operated to always transmit a PDCCH DCI0 instead of transmitting a NACK on PHICH. For an ACK, the NW may not transmit PDCCH, and if the UE does not detect PDCCH, it may interpret the lack of a detected PDCCH as an ACK. In other words, if PDCCH is received, the UE interprets it as a NACK, and if PDCCH is not received, the UE interprets that as an ACK. The NW may also be operated to transmit both PHICH and PDCCH DCI0, with DCI0 containing information about retransmissions. The New Data Indicator (NDI) may not be toggled in case of NACK, which means that the UE will retransmit the packet in PUSCH. The DCI0 may contain the Redundancy Version (RV) and the grant. Even if the grant does not change across HARQ retransmissions, the grant information may be sent every time a retransmission (NACK) is occurring. The NW may also use the DCI information to change the grant if needed. It is advantageous to use DCI as opposed to NACK, as DCI is more robustly coded, and it is possible to remain compliant with the specification. It should be noted, however, that according to the specification ACK may still need to be monitored.

In one set of embodiments, a new DCI format may be introduced to further improve HARQ feedback indication among wireless communications devices. FIG. 10a shows a table 1002 that illustrates the contents of DCI for the current format (according to prior art) and FIG. 10b shows a table 1004 that illustrates the contents of DCI for a new proposed format for improved HARQ feedback indication. The goal is to compact the DCI as much as possible. If a lower coding rate is desired, the intent is to transmit fewer bits. The new format may specify the following minimum information:

NDI (1 bit)
ACK/NACK bit (1 bit).

This information may be deemed necessary to run the UL HARQ. The small size of the content specified in this format and the potential use of a high aggregation level (for e.g. AL=8) lowers the coding rate, and hence improves the performance detection of the ACK/NACK information. As a possible alternative/extension, this new format may also include bits on CSI/SRS request, and MCS/RV to provide more flexibility to the eNB scheduler.

Figure 11:
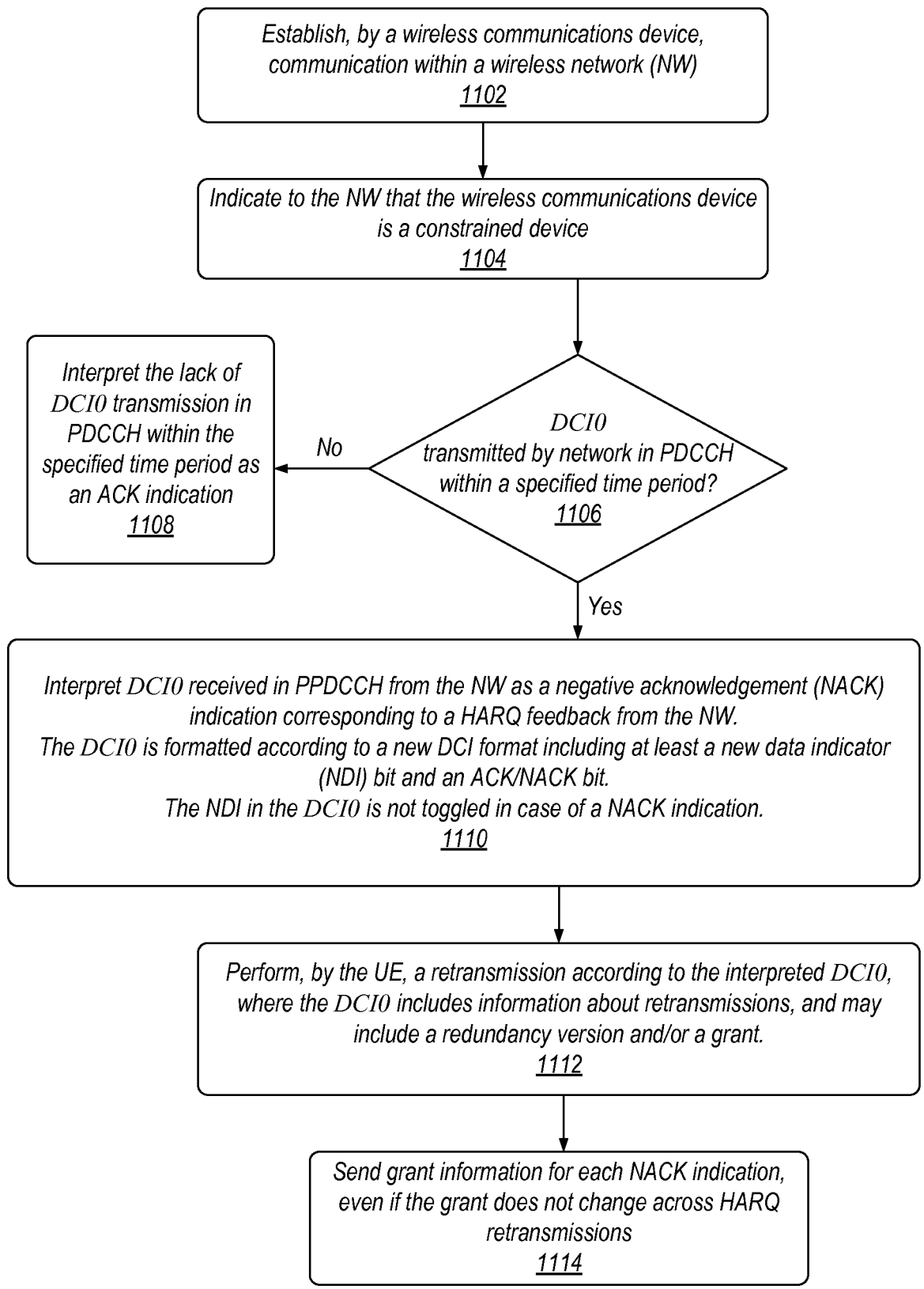
FIG. 11 is a flowchart diagram illustrating how wireless communications may be conducted with improved HARQ feedback indication, according to one set of embodiments.

FIG. 11 is a flowchart diagram illustrating how wireless communications may be conducted with improved HARQ feedback indication, according to one set of embodiments. A wireless communications device, e.g. user equipment (UE), may establish communications within a wireless network (1102). An indication may be sent to the wireless network (NW) that the wireless communication device is a constrained device (1004). For example, the UE may itself send an indication to the NW (or to a base station) that the UE is a special type of device, e.g. that the UE is a constrained device. In a broader sense, the indication of a special type of device may include information regarding (or corresponding to) any one or more characteristics and/or limitations of the wireless communications device. If DCI0 is not transmitted by the NW in PDCCH within a specified time period ("No" branch taken at 1106), the wireless communications device may interpret the lack of DCI0 transmission in PDCCH within the specified time period by the NW as an ACK indication (1108). That is, not receiving a DCI0 in PDCCH from the NW within a specified time period is interpreted by the wireless communications device as an ACK indication.

If DCI0 is transmitted by the NW in PDCCH within the specified time period ("Yes" branch taken at 1106), then the DCI0 received in PPDCCH from the NW may be interpreted, e.g. by the wireless communications device, as a negative acknowledgement (NACK) indication corresponding to a HARQ feedback received from the NW (1110). In some embodiments, the DCI0 may be formatted according to a new DCI format including at least a new-data indicator bit and an ACK/NACK bit (1110). According to the formatting, the NDI in the DCI0 is not toggled in case of a NACK indication (1110). The wireless communications device may then perform a retransmission according to the interpreted DCI0, where the DCI0 includes information about retransmissions, and may include a redundancy version and/or a grant (1112). Grant information may be sent for each NACK indication, even if the grant does not change across HARQ retransmissions (1114).

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for wireless communications with improved Hybrid Automatic Repeat Request (HARQ) feedback indication, the method comprising:
    establishing, by a wireless communications device (WCD), communication within a wireless network (NW);
    indicating, by the WCD to a base station in the NW via signaling at an early stage of communication between the base station and the WCD, that the WCD is a constrained device that cannot reliably detect a Physical Hybrid Automatic Repeat Request Indicator Channel (PHICH) in response to a transmission of WCD data on a physical uplink shared channel (PUSCH);
    interpreting, by the WCD, Downlink Control Information (DCI) received from the base station by the WCD as a negative acknowledgement (NACK) indication corresponding to a HARQ feedback from the base station; and
    performing, by the WCD, an uplink retransmission according to the interpreted DCI.

2. The method of claim 1, further comprising:
    interpreting, by the WCD, a lack of DCI transmission by the base station within a specified time period as an acknowledgment indication.

3. The method of claim 1, wherein the DCI comprises information about retransmissions.

4. The method of claim 1, wherein the DCI comprises a new-data indicator that is not toggled.

5. The method of claim 1, wherein the DCI comprises at least one of the following:
    a redundancy version; or
    a grant.

6. The method of claim 5, further comprising:
    sending grant information for each NACK indication, even if the grant does not change across HARQ retransmissions.

7. The method of claim 1, wherein the DCI is formatted according to a new DCI format, comprising at least:
    a new data indicator (NDI) bit; and
    an acknowledge/negative acknowledge (ACK/NACK) bit.

8. A wireless communication system, the system comprising:
    a wireless communications device (WCD) configured to:
        establish wireless communications within a wireless network (NW);
        indicate to a base station in the NW via signaling at an early stage of communication between the base station and the WCD that the WCD is a constrained device that cannot reliably detect a Physical Hybrid Automatic Repeat Request Indicator Channel (PHICH) in response to a transmission of WCD data on a physical uplink shared channel (PUSCH);
        interpret Downlink Control Information (DCI) received from the base station as negative acknowledgement (NACK) indication corresponding to a HARQ from the base station; and
        perform an uplink retransmission according to the interpreted DCI.

9. The system of claim 8, wherein the base station is configured to not transmit on a PHICH to the WCD based on:
    the WCD indicating to the base station that the WCD is a constrained device; and
    at least one of:
        a previously determined agreement with the WCD; or
        metrics reported by the WCD.

10. The system of claim 9, wherein the reported metrics comprise one or more of the following:
    Channel Quality Indicator; or
    Reference Signal Received Power.

11. The system of claim 9, wherein the previously determined agreement with the WCD comprises anticipation by the base station of how much degradation to expect on one or more power characteristics for the WCD.

12. The system of claim 8, wherein the base station is configured to transmit a PDCCH DCI instead of transmitting a NACK on a Physical HARQ Indicator Channel.

13. The system of claim 8, wherein the WCD is configured to interpret a lack of DCI transmission by the base station within a specified time period as an acknowledgment indication.

14. A non-transitory memory element storing instructions executable by a processing element to cause a wireless communications device to:
    establish wireless communications with a base station;
    indicate to the base station via signaling at an early stage of communication between the base station and the wireless communication device that the wireless communications device is a special type of device that cannot reliably detect a Physical Hybrid Automatic Repeat Request Indicator Channel (PHICH) in response to a transmission of WCD data on a physical uplink shared channel (PUSCH);
    interpret control information received from the base station as a negative acknowledgement (NACK) indication corresponding to an automatic repeat request from the base station; and
    perform an uplink retransmission according to the interpreted control information.

15. The non-transitory memory element of claim 14, wherein the stored instructions are further executable by the processing element to cause the wireless communications device to:
    interpret the base station not having transmitted the control information within a specified time period as an acknowledgment indication corresponding to the automatic repeat request from the base station.

16. The non-transitory memory element of claim 14, wherein the control information comprises at least one of the following:
    a redundancy version;
    a grant;
    information about retransmissions;
    channel state information;
    sounding reference signal request information; or
    modulation and coding scheme information.

17. The non-transitory memory element of claim 14, wherein the control information is formatted according to a downlink control information format, comprising at least:
    a new-data indicator bit; and
    an acknowledge/negative acknowledge (ACK/NACK) bit.

18. The non-transitory memory element of claim 17, wherein the new-data indicator is not toggled in case of a NACK.

19. The non-transitory memory element of claim 14, wherein the stored instructions are further executable by the processing element to cause the wireless communications device to:
    transmit metrics to the base station, wherein the base station is configured to determine whether to transmit information on a physical indicator channel to the wireless communications device based at least on the metrics.

20. The non-transitory memory element of claim 14, wherein the metrics comprise one or more of the following:
    Channel Quality Indicator; or
    Reference Signal Received Power.

* * * * *